(12) United States Patent
Matsuda

(10) Patent No.: US 9,572,356 B2
(45) Date of Patent: Feb. 21, 2017

(54) OIL/FAT COMPOSITION

(71) Applicant: KAO CORPORATION, Chuo-ku (JP)

(72) Inventor: Yuumi Matsuda, Sumida-ku (JP)

(73) Assignee: KAO CORPORATION, Chuo-ku (JP)

( * ) Notice: Subject to any disclaimer, the term of this patent is extended or adjusted under 35 U.S.C. 154(b) by 12 days.

(21) Appl. No.: 14/385,901

(22) PCT Filed: Mar. 29, 2013

(86) PCT No.: PCT/JP2013/059483
§ 371 (c)(1),
(2) Date: Sep. 17, 2014

(87) PCT Pub. No.: WO2013/147132
PCT Pub. Date: Oct. 3, 2013

(65) Prior Publication Data
US 2015/0079261 A1 Mar. 19, 2015

(30) Foreign Application Priority Data

Mar. 30, 2012 (JP) ................. 2012-078601

(51) Int. Cl.
*A23D 9/06* (2006.01)
*A23D 7/06* (2006.01)
*A23D 9/007* (2006.01)
*C11B 5/00* (2006.01)

(52) U.S. Cl.
CPC . *A23D 9/06* (2013.01); *A23D 7/06* (2013.01); *A23D 9/007* (2013.01); *C11B 5/0085* (2013.01)

(58) Field of Classification Search
None
See application file for complete search history.

(56) References Cited

U.S. PATENT DOCUMENTS

| | | | |
|---|---|---|---|
| 4,874,629 A | 10/1989 | Chang et al. | |
| 5,023,100 A | 6/1991 | Chang et al. | |
| 5,084,289 A | 1/1992 | Shin et al. | |
| 2003/0113391 A1 | 6/2003 | Brown et al. | |
| 2003/0198629 A1 | 10/2003 | Brown et al. | |
| 2009/0130260 A1 | 5/2009 | Reglero Rada et al. | |
| 2010/0178369 A1 | 7/2010 | Arledge et al. | |
| 2011/0189345 A1 | 8/2011 | Reglero Rada et al. | |
| 2011/0293755 A1* | 12/2011 | Sigurjonsson ......... | A61K 31/05 424/734 |
| 2014/0234520 A1 | 8/2014 | Homma et al. | |
| 2014/0234522 A1 | 8/2014 | Homma et al. | |

FOREIGN PATENT DOCUMENTS

| | | |
|---|---|---|
| EP | 1 992 233 A1 | 11/2008 |
| JP | 02-016195 A | 1/1990 |
| JP | 02-055785 A | 2/1990 |
| JP | 02-189394 A | 7/1990 |
| JP | 03-197595 | 8/1991 |
| JP | 07-236418 A | 9/1995 |
| JP | 10-263064 A | 10/1998 |
| JP | 10-331070 | 12/1998 |
| JP | 2002-142673 A | 5/2002 |
| JP | 2003-102382 A | 4/2003 |
| JP | 2003-113017 | 4/2003 |
| JP | 2004-204212 A | 7/2004 |
| JP | 3646255 B2 | 5/2005 |
| JP | 2006-514128 | 4/2006 |
| JP | 2006-193713 | 7/2006 |
| JP | 2007-185138 A | 7/2007 |
| JP | 2008-520221 A | 6/2008 |
| JP | 2013-209436 A | 10/2013 |

OTHER PUBLICATIONS

International Preliminary Report on Patentability and Written Opinion issued Oct. 9, 2014 in PCT/JP2013/059483.
U.S. Appl. No. 14/379,670, filed Aug. 19, 2014, Matsuda.
International Search Report issued May 28, 2013 in PCT/JP2013/059483 filed Mar. 29, 2013.
Edwin N. Frankel, et al., "Antioxidant Activity of a Rosemary Extract and Its Constituents, Carnosic Acid, Carnosol, and Rosmarinic Acid, in Bulk Oil and Oil-in-Water Emulsion" Journal of Agricultural and Food Chemistry, vol. 44, No. 1, Jan. 18, 1996, pp. 131-135.
Hiramitsu Suzuki, "Health Effects of Fish Oil" Journal of Japan Oil Chemists' Society, vol. 48, 1999, 23 Pages (with unedited computer generated English translation).
Extended European Search Report issued Nov. 10, 2015 in Patent Application No. 13768827.1.
"Carvone" Wikipedia, the free encyclopedia, XP055224630, 2011, URL:https://web.archive.org/web/20111027174722/http://en.wikipedia.org/wiki/Carvone.
Gurdip Singh, et al., "Chemical Constituents, Antimicrobial Investigations, and Antioxidative Potentials of *Anethum graveolens* L. Essential Oil and Acetone Extract: Part 52" Journal of Food Science, M:Food Microbiology and Safety, vol. 70, No. 4, XP055223782, 2005, pp. M208-M215.
Sebnem Selen Isbilir, et al., "Antioxidant Potential of Different Dill (*Anethum graveolens* L.) Leaf Extracts" International Journal of Food Properties, vol. 14, No. 4, XP055223785, 2011, pp. 894-902.

(Continued)

*Primary Examiner* — Michele L Jacobson
*Assistant Examiner* — Amber Cox
(74) *Attorney, Agent, or Firm* — Oblon, McClelland, Maier & Neustadt, L.L.P.

(57) ABSTRACT

Provided is a fat or oil composition having high oxidative stability even though containing large amounts of eicosapentaenoic acid and docosahexaenoic acid, and having suppressed degradation odor and unpleasant odor derived from a rosemary extract at the time of cooking. The fat or oil composition comprises the following components (A), (B), and (C):(A) a fat or oil in which a total content of eicosapentaenoic acid and docosahexaenoic acid in constituent fatty acids of the fat or oil is from 0.1 to 20 mass % with respect to total constituent fatty acids of the fat or oil; (B) a rosemary extract; and (C) a dill extract, in which a mass ratio of a content of the component (B) to a content of the component (C), [(B)/(C)], is from 2 to 200.

21 Claims, No Drawings

(56) References Cited

OTHER PUBLICATIONS

Yung-Shin Shyu, et al., "Evaluation of antioxidant ability of ethanolic extract from dill (*Anethum graveolens* L.) flower" Food Chemistry, vol. 115, No. 2, XP026002726, 2009, pp. 515-521.

S.D. Bhale, et al., "Oregano and Rosemary Extracts Inhibit Oxidation of Long-Chain n-3 Fatty Acids in Menhaden Oil" Journal of Food Science, vol. 72, No. 9, XP008110995, 2007, pp. C504-C508.

Stephen S. Chang, et al., "Natural Antioxidants From Rosemary and Sage" Journal of Food Science, vol. 42, No. 4, XP055224432, 1977, pp. 1102-1106.

Edwin N. Frankel, et al., "Oxidative Stability of Fish and Algae Oils Containing Long-Chain Polyunsaturated Fatty Acids in Bulk and in Oil-in-Water Emulsions" Journal of Agricultural and Food Chemistry, vol. 50, XP002387550, 2002, pp. 2094-2099.

Chol Su Pak, "Stability and Quality of Fish Oil During Typical Domestic Application" Fisheries Training Programme, XP003030359, 2005, pp. 1-27.

"Low Flavor and Aroma" Kalsec Inc, XP055224619, 2015, URL:http://www.kalsec.com/products/antioxidants/antioxidants-specialty-products/low-flavor-aroma-antioxidant/.

\* cited by examiner

OIL/FAT COMPOSITION

FIELD OF THE INVENTION

The present invention relates to a fat or oil composition.

BACKGROUND OF THE INVENTION

In recent years, with increasing interests in maintenance and enhancement of health and prevention and treatment of diseases, many studies have been made on physiological functions of fish oil and of eicosapentaenoic acid (C20:5, EPA) and docosahexaenoic acid (C22:6, DHA), which are constituent components of the fish oil. Specifically, an anti-atherogenic action, a cerebral function improving action, a visual function improving action, an anti-tumor action, an anti-inflammatory action, and the like have been reported (Non Patent Document 1). In 2005, the Ministry of Health, Labour and Welfare defined a recommended total intake (adult) of DHA and EPA of 1 g/day, and use of a DHA and EPA-rich fat or oil has been desired.

On the other hand, a highly-unsaturated fatty acid-rich fat or oil has very low oxidative stability and is liable to produce deterioration odor and unpleasant odor/taste, and hence practical realization thereof is significantly restricted.

As technologies for improving oxidative stability of a fat or oil, there has been known, for example, a method involving adding a roasted sesame oil, an ascorbic acid ester, and an herb extract to a fat or oil containing a polyunsaturated fatty acid to stabilize the fat or oil (Patent Document 1). Further, there have been known a lipophilic antioxidant containing, for example, a bayberry extract and a rosemary extract (Patent Document 2), a lipophilic antioxidant containing gallic acid, a water-soluble antioxidant, and an oil-soluble antioxidant (Patent Document 3), and an antioxidant composition including an acetone extract of tea leaves together with a tocopherol and an ascorbic acid ester (Patent Document 4). In addition, the rosemary extract has been known to have high antioxidative property (Non Patent Document 2), an antioxidant including a rosemary extract that includes hexanal, carnosol, and carnosic acid in specified amounts (Patent Document 5), and the like have been reported.

CITATION LIST

Patent Document

[Patent Document 1] JP-A-2-189394
[Patent Document 2] JP-A-2007-185138
[Patent Document 3] JP-A-2002-142673
[Patent Document 4] JP-A-02-55785
[Patent Document 5] JP-A-2004-204212

Non Patent Document

[Non Patent Document 1] "Journal of Japan Oil Chemists' Society", 1999, Vol. 48, p. 1017
[Non Patent Document 2] "Agric. Food Chem.", 1996, Vol. 44, No. 1, p. 131-135

SUMMARY OF THE INVENTION

The present invention provides a fat or oil composition, comprising the following components (A), (B), and (C):(A) a fat or oil in which a total content of eicosapentaenoic acid and docosahexaenoic acid in constituent fatty acids of the fat or oil is from 0.1 to 20 mass % with respect to total constituent fatty acids of the fat or oil; (B) 0.001 to 0.18 mass % of a rosemary extract; and (C) a dill extract, in which a mass ratio of a content of the component (B) to a content of the component (C), [(B)/(C)], is from 2 to 200.

DETAILED DESCRIPTION OF THE INVENTION

However, the technologies described above have a problem in that degradation odor is liable to be produced because of insufficient antioxidative property at the time of heating. Also, a plant extract, in particular, a rosemary extract has very strong flavor, and hence original taste and flavor of a cooked food is hardly sensed when a fat or oil containing the rosemary extract is used for cooking. Therefore, the amount of the fat or oil to be added is inevitably restricted, and it is difficult to improve oxidative stability of the fat or oil.

Therefore, the present invention relates to provide a fat or oil composition having high oxidative stability even though containing large amounts of eicosapentaenoic acid and docosahexaenoic acid, and having suppressed degradation odor and unpleasant odor derived from a rosemary extract at the time of cooking.

The inventor of the present invention made intensive studies to solve the above-mentioned problems. As a result, the inventor found that incorporation of a combination of a rosemary extract and a specific plant extract at a specific ratio into a fat or oil was able to impart high oxidative stability and to suppress degradation odor at the time of cooking and strong odor derived from a plant such as rosemary, to thereby provide a fat or oil composition enabling good taste and flavor of a cooked food to be sensed.

According to the present invention, there is provided a fat or oil composition that has high oxidative stability even though containing large amounts of eicosapentaenoic acid and docosahexaenoic acid, has suppressed degradation odor and unpleasant odor at the time of cooking, and is capable of providing a cooked food excellent in taste and flavor.

A content of the fat or oil as the component (A) of the present invention in the fat or oil composition is preferably from 95 to 99.95 mass % (hereinafter simply referred to as "%"), more preferably from 97 to 99%, from the viewpoint of the use thereof.

In the constituent fatty acids of the fat or oil as the component (A) to be used in the present invention, the total content of eicosapentaenoic acid and docosahexaenoic acid with respect to total constituent fatty acids of the fat or oil is 0.1% or more and 20% or less, that is, from 0.1 to 20%, and is preferably 0.3% or more, more preferably 1% or more, even more preferably 2% or more, from the viewpoint of physiological effects. Further, the total content of eicosapentaenoic acid and docosahexaenoic acid is preferably 15% or less, more preferably 10% or less, more preferably 7% or less, even more preferably 5% or less, from the viewpoint of oxidative stability. The total content of eicosapentaenoic acid and docosahexaenoic acid in the constituent fatty acids of the fat or oil as the component (A) with respect to total constituent fatty acids of the fat or oil is preferably from 0.1 to 15%, more preferably from 0.3 to 10%, more preferably from 1 to 7%, even more preferably from 2 to 5%, from the viewpoints of both of physiological effects and oxidative stability. It should be noted that the amount of a fatty acid herein refers to an amount obtained by converting it to a free fatty acid.

The constituent fatty acids of the fat or oil as the component (A) other than eicosapentaenoic acid and docosahexaenoic acid are not particularly limited, and may be any of saturated fatty acids and unsaturated fatty acids. The content of the unsaturated fatty acids in the constituent fatty acids of the fat or oil other than eicosapentaenoic acid and docosahexaenoic acid is preferably from 60 to 100%, more preferably from 70 to 100%, more preferably from 75 to 100%, even more preferably from 80 to 98%, from the viewpoints of appearance and the industrial productivity of the fat or oil. The carbon numbers of the unsaturated fatty acids are preferably from 14 to 24, more preferably from 16 to 22, from the viewpoint of physiological effects.

In addition, the content of the saturated fatty acids of the constituent fatty acids of the fat or oil as the component (A) is preferably 40% or less, more preferably 30% or less, more preferably 25% or less, even more preferably 20% or less. Further, the content is preferably 0.5% or more, from the viewpoint of the industrial productivity of the fat or oil. The carbon numbers of the saturated fatty acids are preferably from 14 to 24, more preferably from 16 to 22.

In the present invention, substances constituting the fat or oil as the component (A) include monoacylglycerols and diacylglycerols as well as triacylglycerols. That is, the fat or oil as the component (A) in the present invention contains any one or more of monoacylglycerols, diacylglycerols, and triacylglycerols.

The content of the triacylglycerols in the fat or oil as the component (A) is preferably from 78 to 100%, more preferably from 88 to 100%, more preferably from 90 to 99.5%, even more preferably from 92 to 99%, from the viewpoint of the industrial productivity of the fat or oil.

Further, the content of the diacylglycerols in the fat or oil as the component (A) is preferably 19% or less, more preferably 9% or less, more preferably from 0.1 to 7%, even more preferably from 0.2 to 5%, from the viewpoint of the industrial productivity of the fat or oil. Moreover, the content of the monoacylglycerols in the fat or oil as the component (A) is preferably 3% or less, more preferably from 0 to 2%, from the viewpoint of improvement of taste and flavor.

In addition, the content of a free fatty acid or a salt thereof contained in the fat or oil composition of the present invention is preferably 5% or less, more preferably from 0 to 2%, even more preferably from 0 to 1%, from the viewpoints of the taste and flavor and the industrial productivity of the fat or oil.

An edible fat or oil that may be used as an origin of the fat or oil as the component (A) of the present invention is not particularly limited, and examples thereof may include the following fats or oils: plant-derived fats or oils such as soybean oil, rapeseed oil, safflower oil, rice oil, corn oil, palm oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm olein, palm stearin, coconut oil, palm kernel oil, cacao fat, sal fat, Shea fat, and algae oil; animal-derived fats or oils such as fish oil, lard, beet tallow, and butter fat; and transesterified oils, hydrogenated oils, and fractionated oils thereof, or the like. The oils may each be used singly or may be mixed appropriately before use. Of those, from the viewpoint of usability, a liquid fat or oil excellent in low-temperature resistance is preferably used, and one or two or more selected from the group consisting of fish oil and alga oil are more preferably used because the oils are rich in eicosapentaenoic acid and docosahexaenoic acid. It should be noted that the liquid fat or oil refers to a fat or oil that stays liquid at 20° C., when determined in accordance with a cold test described in Standard Method for the Analysis of Fats, Oils and Related Materials 2.3.8-27. In addition, the edible fat or oil is preferably a refined fat or oil obtained by a refinement step.

The rosemary extract as the component (B) to be used in the present invention refers to an extract of rosemary (Japanese name: Mannenrou) belonging to the genus *Rosmarinus* of the family Lamiaceae (*Rosmarinus officinalis* L.). The variety of the rosemary includes Brenenden Blue, Creeping, Marine Blue, Majolica pink, Tuscan Blue, and Rex, or the like. In the present invention, all of them may be used.

The part of the rosemary to be used for obtaining the rosemary extract as the component (B) is not particularly limited, and examples thereof include leaf, stem, germ, flower, branch, root, and seed, or the like, as well as a mixture thereof. The parts may be subjected to an extraction step without additional treatment, or may be subjected thereto after pulverization, cutting, or drying.

As extraction means for obtaining an extract, there may be used any means such as solid-liquid extraction, liquid-liquid extraction, immersion, decoction, leaching, steam distillation, reflux extraction, sonication extraction, microwave extraction, or stirring.

A solvent for extraction is not particularly limited, and examples thereof include: water; an alcohol such as methanol or ethanol; subcritical or supercritical carbon dioxide; an edible fat or oil such as soybean oil, rapeseed oil, sunflower oil, palm oil, or lard; and a mixture thereof.

In addition, as the rosemary extract as the component (B), there may be used a commercially available product, preferably a commercially available antioxidant, more preferably a commercially available antioxidant for foods and beverages.

The rosemary extract as the component (B) may be a purified crude product as long as the extract meets a standard acceptable for foods use, and exerts the effect according to the present invention. The resultant purified crude product may further be purified by using known separation and purification methods in combination. As purification means, there are given, for example, precipitation with an organic solvent, centrifugation, ultrafiltration, treatment with an adsorbent, high-performance liquid chromatography, and column chromatography.

The content of the rosemary extract as the component (B) in the fat or oil composition is 0.001% or more and 0.18% or less, that is, from 0.001 to 0.18%, and is preferably 0.002% or more, more preferably 0.004% or more, more preferably 0.008% or more, more preferably 0.016% or more, even more preferably 0.04% or more, from the viewpoint of oxidative stability. In addition, the content of the rosemary extract as the component (B) in the fat or oil composition is preferably 0.16% or less, more preferably 0.14% or less, even more preferably 0.1% or less, from the viewpoint of taste and flavor. The content of the rosemary extract as the component (B) in the fat or oil composition is preferably from 0.002 to 0.18%, more preferably from 0.004 to 0.16%, more preferably from 0.008 to 0.14%, more preferably from 0.016 to 0.1%, even more preferably from 0.04 to 0.1%, from the viewpoints of both of oxidative stability and taste and flavor.

In the case where the total content of eicosapentaenoic acid and docosahexaenoic acid in the constituent fatty acids of the fat or oil as the component (A) is 5% or more, the content of the rosemary extract as the component (B) in the fat or oil composition is preferably from 0.016 to 0.18%. Further, in the case where the total content of eicosapentaenoic acid and docosahexaenoic acid in the constituent fatty acids of the fat or oil as the component (A) is 10% or more, the content of the rosemary extract as the component (B) in the fat or oil composition is preferably from 0.04 to 0.18%.

The ratio of the total content of eicosapentaenoic acid and docosahexaenoic acid in the constituent fatty acids of the fat or oil as the component (A) to the content of the rosemary extract as the component (B) in the fat or oil composition, [C20:5+C22:6/(B)], is preferably 2,500 or less, more preferably 1,250 or less, even more preferably 500 or less, from the viewpoint of oxidative stability, and is preferably 1 or more, more preferably 10 or more, even more preferably 20 or more, from the viewpoint of taste and flavor. The ratio of the total content of eicosapentaenoic acid and docosahexaenoic acid in the constituent fatty acids of the fat or oil as the component (A) to the content of the rosemary extract as the component (B) in the fat or oil composition, [C20:5+C22:6/(B)], is preferably from 1 to 2,500, more preferably from 10 to 1,250, even more preferably from 20 to 500, from the viewpoints of both of oxidative stability and taste and flavor.

The dill extract as the component (C) to be used in the present invention refers to an extract of dill belonging to the genus *Anethum* (*Anethum graveolens* L.).

The part of the dill to be used for obtaining the dill extract as the component (C) is not particularly limited, and examples thereof include leaf, stem, germ, flower, branch, root, fruit, and seed, or the like, as well as a mixture thereof. The parts may be subjected to an extraction step without additional treatment, or may be subjected thereto after pulverization, cutting, or drying.

Further, an extraction means for obtaining the dill extract as the component (C), a purification method for a solvent for extraction, and the like are the same as those of the rosemary extract as the component (B).

In addition, as the dill extract as the component (C), there may be used a commercially available product, preferably a commercially available product for foods use.

The content of the dill extract as the component (C) in the fat or oil composition is preferably 0.00002% or more, more preferably 0.00004% or more, more preferably 0.0001% or more, more preferably 0.0002% or more, more preferably 0.0004% or more, more preferably 0.0005% or more, even more preferably 0.001% or more, from the viewpoint of suppression of odor derived from the rosemary extract. In addition, the content of the dill extract as the component (C) in the fat or oil composition is preferably 0.05% or less, more preferably 0.02% or less, even more preferably 0.01% or less, from the viewpoint of taste and flavor. The content of the dill extract as the component (C) in the fat or oil composition is preferably from 0.00002 to 0.05%, more preferably from 0.00004 to 0.02%, even more preferably from 0.0001 to 0.01%, from the viewpoints of both of suppression of odor derived from the rosemary extract, and taste and flavor.

In the case where the total content of eicosapentaenoic acid and docosahexaenoic acid in the constituent fatty acids of the fat or oil as the component (A) is 5% or more, the content of the dill extract as the component (C) in the fat or oil composition is preferably from 0.0004 to 0.05%. Further, in the case where the total content of eicosapentaenoic acid and docosahexaenoic acid in the constituent fatty acids of the fat or oil as the component (A) is 10% or more, the content of the dill extract as the component (C) in the fat or oil composition is preferably from 0.001 to 0.05%.

It should be noted that in the present invention, the rosemary extract as the component (B) and the dill extract as the component (C) may have a purity of about 100% or may be extracted or diluted with a solvent. The content of the rosemary extract as the component (B) or the dill extract as the component (C) in the present invention is determined based on the mass of a pure substance containing no solvent.

In the fat or oil composition of the present invention, the mass ratio of the content of the component (B) to the content of the component (C), [(B)/(C)], is 2 or more and 200 or less, that is, from 2 to 200, and is preferably 4 or more, more preferably 10 or more, more preferably 16 or more, even more preferably 40 or more, from the viewpoints of suppression of odor derived from the dill extract as the component (C), and taste and flavor. In addition, the mass ratio of the content of the component (B) to the content of the component (C), [(B)/(C)], is preferably 150 or less, more preferably 100 or less, from the viewpoint of suppression of odor derived from the rosemary extract as the component (B). The mass ratio [(B)/(C)] of the content of the component (B) to the content of the component (C) is preferably from 4 to 200, more preferably from 10 to 150, more preferably from 16 to 100, even more preferably from 40 to 100, from the viewpoints of suppression of odor derived from the dill extract as the component (C), taste and flavor, and suppression of odor derived from the rosemary extract as the component (B).

In addition, the fat or oil composition of the present invention contains an antioxidant other than the component (B) and the component (C) in the fat or oil composition at preferably from 0.01 to 0.2%, more preferably from 0.02 to 0.1%, from the viewpoint of oxidative stability at the time of each of preservation and cooking. Examples of the antioxidant include a natural antioxidant, a tocopherol, and an ascorbic acid ester, or the like. Of those, one or two or more of antioxidants selected from the group consisting of a natural antioxidant, a tocopherol, and ascorbyl palmitate are preferably used, and a combination of ascorbyl palmitate and a tocopherol is more preferably used.

The fat or oil composition of the present invention can be obtained by, for example, adding the component (B), the component (C), and, if necessary, other components to the fat or oil as the component (A) and optionally, for example, heating and stirring the resultant mixture.

Such fat or oil composition can be used in the same manner as a general edible fat or oil, and can be widely applied to a variety of foods and beverages including the fat or oil. In particular, the fat or oil composition is used suitably as a fat or oil for cooking, more suitably as a fat or oil for cooking of a deep-fried food such as by or tempura, a sauteed food, or a grilled food.

In relation to the above-mentioned embodiment, the present invention discloses the following fat or oil compositions or uses.

<1> A fat or oil composition, comprising the following components (A), (B), and (C):
  (A) a fat or oil in which the total content of eicosapentaenoic acid and docosahexaenoic acid in constituent fatty acids of the fat or oil is 0.1 mass % or more and 20 mass % or less, that is, from 0.1 to 20 mass % with respect to total constituent fatty acids of the fat or oil;
  (B) 0.001 mass % or more and 0.18 mass % or less, that is, from 0.001 to 0.18 mass % of a rosemary extract; and
  (C) a dill extract, in which the mass ratio of the content of the component (B) to the content of the component (C), [(B)/(C)], is 2 or more and 200 or less, that is, from 2 to 200.

<2> The fat or oil composition according to the above-mentioned item <1>, in which the total content of eicosapentaenoic acid and docosahexaenoic acid in the constituent fatty acids of the fat or oil as the component (A) with respect to total fatty acids is preferably 0.3 mass % or more, more preferably 1 mass % or more, even more preferably 2 mass % or more.

<3> The fat or oil composition according to the above-mentioned item <1> or <2>, in which the total content of eicosapentaenoic acid and docosahexaenoic acid in the constituent fatty acids of the fat or oil as the component (A) with respect to the total fatty acids is preferably 15 mass % or less, more preferably 10 mass % or less, more preferably 7 mass % or less, even more preferably 5 mass % or less.

<4> The fat or oil composition according to the above-mentioned item <1>, in which the total content of eicosapentaenoic acid and docosahexaenoic acid in the constituent fatty acids of the fat or oil as the component (A) with respect to the total fatty acids is preferably from 0.1 to 15 mass %, more preferably from 0.3 to 10 mass %, more preferably from 1 to 7 mass %, even more preferably from 2 to 5 mass %.

<5> The fat or oil composition according to any one of the above-mentioned items <1> to <4>, in which the component (A) preferably comprises one or two kinds of fats or oils selected from the group consisting of fish oil and alga oil.

<6> The fat or oil composition according to any one of the above-mentioned items <1> to <5>, in which the content of the rosemary extract as the component (B) is preferably 0.002 mass % or more, more preferably 0.004 mass % or more, more preferably 0.008 mass % or more, even more preferably 0.016 mass % or more.

<7> The fat or oil composition according to any one of the above-mentioned items <1> to <6>, in which the content of the rosemary extract as the component (B) is preferably 0.16 mass % or less, more preferably 0.14 mass % or less, even more preferably 0.1 mass % or less.

<8> The fat or oil composition according to any one of the above-mentioned items <1> to <5>, in which the content of the rosemary extract as the component (B) is preferably from 0.002 to 0.18 mass %, more preferably from 0.004 to 0.16 mass %, more preferably from 0.008 to 0.14 mass %, even more preferably from 0.016 to 0.1 mass %.

<9> The fat or oil composition according to any one of the above-mentioned items <1> to <8>, in which the ratio of the total content of eicosapentaenoic acid and docosahexaenoic acid in the constituent fatty acids of the fat or oil as the component (A) to the content of the rosemary extract as the component (B) in the fat or oil composition, [C20:5+C22:6/(B)], is preferably 5 or more, more preferably 10 or more, even more preferably 20 or more.

<10> The fat or oil composition according to any one of the above-mentioned items <1> to <9>, in which the ratio of the total content of eicosapentaenoic acid and docosahexaenoic acid in the constituent fatty acids of the fat or oil as the component (A) to the content of the rosemary extract as the component (B) in the fat or oil composition, [C20:5+C22:6/(B)], is preferably 2,500 or less, more preferably 1,250 or less, even more preferably 500 or less.

<11> The fat or oil composition according to any one of the above-mentioned items <1> to <8>, in which the ratio of the total content of eicosapentaenoic acid and docosahexaenoic acid in the constituent fatty acids of the fat or oil as the component (A) to the content of the rosemary extract as the component (B) in the fat or oil composition, [C20:5+C22:6/(B)], is preferably from 1 to 2,500, more preferably from 10 to 1,250, even more preferably from 20 to 500.

<12> The fat or oil composition according to any one of the above-mentioned items <1> to <11>, in which the content of the dill extract as the component (C) is preferably 0.00002 mass % or more, more preferably 0.00004 mass % or more, more preferably 0.0001 mass % or more, more preferably 0.0002 mass % or more, even more preferably 0.0005 mass % or more.

<13> The fat or oil composition according to any one of the above-mentioned items <1> to <12>, in which the content of the dill extract as the component (C) is preferably 0.05 mass % or less, more preferably 0.02 mass % or less, even more preferably 0.01 mass % or less.

<14> The fat or oil composition according to any one of the above-mentioned items <1> to <11>, in which the content of the dill extract as the component (C) is preferably from 0.00002 to 0.05 mass %, more preferably from 0.00004 to 0.02 mass %, even more preferably from 0.0001 to 0.01 mass %.

<15> The fat or oil composition according to any one of the above-mentioned items <1> to <14>, in which the mass ratio of the content of the component (B) to the content of the component (C), [(B)/(C)], is preferably 4 or more, more preferably 10 or more, more preferably 16 or more, even more preferably 40 or more.

<16> The fat or oil composition according to any one of the above-mentioned items <1> to <15>, in which the mass ratio of the content of the component (B) to the content of the component (C), [(B)/(C)], is preferably 150 or less, more preferably 100 or less.

<17> The fat or oil composition according to any one of the above-mentioned items <1> to <14>, in which the mass ratio of the content of the component (B) to the content of the component (C), [(B)/(C)], is preferably from 4 to 200, more preferably from 10 to 150, more preferably from 16 to 100, even more preferably from 40 to 100.

<18> The fat or oil composition according to any one of the above-mentioned items <1> to <17>, comprising preferably from 95 to 99.95 mass %, more preferably from 97 to 99 mass % of the fat or oil as the component (A).

<19> The fat or oil composition according to any one of the above-mentioned items <1> to <18>, in which the content of triacylglycerols in the fat or oil as the component (A) is preferably from 78 to 100 mass %, more preferably from 88 to 100 mass %, more preferably from 90 to 99.5 mass %, even more preferably from 92 to 99 mass %.

<20> The fat or oil composition according to any one of the above-mentioned items <1> to <19>, in which the content of unsaturated fatty acids in the constituent fatty acids of the fat or oil as the component (A) other than eicosapentaenoic acid and docosahexaenoic acid is preferably from 60 to 100 mass %, more preferably from 70 to 100 mass %, more preferably from 75 to 100 mass %, even more preferably from 80 to 98 mass %.

<21> The fat or oil composition according to any one of the above-mentioned items <1> to <20>, further comprising preferably one or two or more selected from the group consisting of a natural antioxidant, a tocopherol, and an ascorbic acid ester, more preferably one or two or more selected from the group consisting of a natural antioxidant, a tocopherol, and ascorbyl palmitate, even more preferably ascorbyl palmitate and a tocopherol.

<22> The fat or oil composition according to the above-mentioned item <21>, in which the content of the antioxidant is preferably from 0.01 to 0.2 mass %, more preferably from 0.02 to 0.1 mass %.

<23> The fat or oil composition according to any one of the above-mentioned items <1> to <22>, in which the rosemary extract as the component (B) is preferably an extract obtained from one part or two or more parts selected from the group consisting of leaf, stem, germ, flower, branch, root, and seed of rosemary.

<24> The fat or oil composition according to any one of the above-mentioned items <1> to <23>, in which the rosemary extract as the component (B) is preferably one extracted with one or two or more of solvents selected from the group consisting of water, water vapor, an alcohol, subcritical or supercritical carbon dioxide, and an edible fat or oil.

<25> The fat or oil composition according to the above-mentioned item <24>, in which the alcohol is preferably one or two selected from the group consisting of methanol and ethanol, and the edible fat or oil is one or two or more selected from the group consisting of soybean oil, rapeseed oil, sunflower oil, palm oil, and lard.

<26> The fat or oil composition according to any one of the above-mentioned items <1> to <25>, in which the dill extract as the component (C) is preferably an extract obtained from one part or two or more parts selected from the group consisting of leaf, stem, germ, flower, branch, root, fruit, and seed of dill.

<27> The fat or oil composition according to any one of the above-mentioned items <1> to <26>, in which the dill extract as the component (C) is preferably one extracted with one or two or more of solvents selected from the group consisting of water, water vapor, an alcohol, subcritical or supercritical carbon dioxide, and an edible fat or oil.

<28> The fat or oil composition according to the above-mentioned item <27>, in which the alcohol is preferably one or two selected from the group consisting of methanol and ethanol, and the edible fat or oil is one or two or more selected from the group consisting of soybean oil, rapeseed oil, sunflower oil, palm oil, and lard.

<29> The fat or oil composition according to any one of the above-mentioned items <1> to <28>, in which the rosemary extract as the component (B) is preferably a commercially available product, more preferably a commercially available antioxidant, even more preferably a commercially available antioxidant for foods and beverages use.

<30> The fat or oil composition according to any one of the above-mentioned items <1> to <29>, in which the dill extract as the component (C) is preferably a commercially available product, more preferably a commercially available product for foods use.

<31> Use of the fat or oil composition according to any one of the above-mentioned items <1> to <30> as an edible fat or oil.

<32> The use according to the above-mentioned item <31> as a fat or oil for cooking.

<33> The use according to the above-mentioned item <31> as a fat or oil for cooking of a deep-fried food, a sauteed food, or a grilled food.

EXAMPLES

Analysis Methods (1) Composition of Glycerides in Fat or Oil

About 10 mg of a fat or oil sample and 0.5 mL of a trimethylsilylating agent ("Silylating agent TH," manufactured by Kanto Chemical Co., Inc.) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).

<GLC Analysis Conditions>
(Conditions)
Apparatus: Agilent 6890 Series (manufactured by Agilent Technologies)
Integrator: ChemStation B.02.01 SR2 (manufactured by Agilent Technologies)
Column: DB-1ht (manufactured by Agilent J&W)
Carrier gas: 1.0 mL He/min
Injector: Split (1:50), T=320° C.
Detector: FID, T=350° C.
Oven temperature: The temperature was raised from 80° C. to 340° C. at 10° C./min, and kept for 15 minutes.

(2) Composition of Constituent Fatty Acids in Fat or Oil

Fatty acid methyl esters were prepared in accordance with "Preparation method for fatty acid methyl ester (2.4.1.-1996)" described in "Standard Method for the Analysis of Fats, Oils and Related Materials" edited by Japan Oil Chemists' Society, and the resultant fat or oil samples were subjected to measurement in accordance with American Oil Chemists. Society Official Method Ce 1f-96 (GLC method).

<GLC Analysis Conditions>
Column: CP-SIL88 100 m×0.25 mm×0.2 μm (VARIAN)
Carrier gas: 1.0 mL He/min
Injector: Split (1:200), T=250° C.
Detector: FID, T=250° C.
Oven temperature: The temperature was kept at 174° C. for 50 minutes, raised to 220° C. at 5° C./min, and kept for 25 minutes.

(Raw Materials)

Fats or oils having the compositions shown in Table 1 (fat or oil a: NISSUI DHA-27 (manufactured by Nippon Suisan Kaisha, Ltd.) and fat or oil b: rapeseed salad oil (manufactured by The Nisshin OilliO Group, Ltd.)) were used as the fats or oils a and b (A).

Preparations (RME-1 to RME-5 and PE-1 to PE-3) shown in Table 2 were used as the rosemary extract (B) and the dill extract (C), respectively.

TABLE 1

| | Fatty acid composition (mass %) | | | | | | | | | |
|---|---|---|---|---|---|---|---|---|---|---|
| | C16:0 | C16:1 | C17:0 | C17:1 | C18:0 | C18:1 | C18:2 | C18:3 | C20:0 | C20:1 |
| Fat or oil a | 18.81 | 5.36 | 0.66 | 0.70 | 5.38 | 20.24 | 1.64 | 0.95 | — | 2.11 |
| Fat or oil b | 4.05 | 0.21 | — | — | 1.75 | 61.50 | 19.79 | 10.18 | 0.60 | 1.15 |

TABLE 1-continued

| | Fatty acid composition (mass %) | | | | | | | Glyceride composition (mass %) | | | |
|---|---|---|---|---|---|---|---|---|---|---|---|
| | C20:2 | C20:5 | C22:0 | C22:1 | C22:6 | C24:0 | C24:1 | FFA | MAG | DAG | TAG |
| Fat or oil a | 0.34 | 7.28 | — | — | 28.32 | 0.86 | 1.49 | 0.08 | 3.59 | 3.22 | 93.11 |
| Fat or oil b | — | — | 0.34 | 0.05 | — | 0.15 | 0.23 | 0.03 | 0.00 | 1.58 | 98.40 |

MAG: Monoacylglycerol
DAG: Diacylglycerol
TAG: Triacylglycerol
FFA: Free fatty acid

TABLE 2

| | Abbreviated name | Company name | Name | Content of extract in preparation [mass %] |
|---|---|---|---|---|
| Rosemary extract | RME-1 | KALSEC | Herbalox HT-O | 40 |
| | RME-2 | Mitsubishi-Kagaku Foods Corporation | RM Keeper OS | 20 |
| | RME-3 | T. HASEGAWA CO., LTD. | Seasoning Oil TH-RA-2 | 7.7 |
| | RME-4 | Ogawa & Co., Ltd. | Spice OG Rosemary | 10 |
| | RME-5 | EIKODO | Rosemary Oil 23049 | 100 |
| Dill extract | PE-1 | Ogawa & Co., Ltd. | Spice OG Dill | 10 |
| | PE-2 | EIKODO | Dill Seed Oil 01030 | 100 |
| | PE-3 | T. HASEGAWA CO., LTD. | Dill Flavor FH-3911 | 3.0 |

Examples 1 to 8 and Comparative Examples 1 to 5

(Preparation of Fat or Oil Compositions)

The fat or oil a, fat or oil b, rosemary extract (RME-1), dill extract (PE-1), and mixed tocopherols (manufactured by Archer Daniels Midland) were mixed to prepare fat or oil compositions, respectively. The total contents of eicosapentaenoic acid (C20:5) and docosahexaenoic acid (C22:6) in constituent fatty acids of the fats or oils in the fat or oil compositions (total amount: 100 mass %), and the contents of the rosemary extract, the contents of the dill extract, and the contents of the mixed tocopherols in the fat or oil compositions are as shown in Table 3. It should be noted that the blending amounts of the rosemary extract and dill extract in the preparations were determined from the contents of the extracts in the preparations shown in Table 2 so as to achieve the contents shown in Table 3.

(Evaluation of Oxidative Stability)

The fat or oil compositions shown in Table 3 were used to evaluate oxidative stability. The oxidative stability was evaluated in accordance with "CDM test (2.5.1.2-1996)" described in "Standard Method for the Analysis of Fats, Oils and Related Materials" edited by Japan Oil Chemists' Society by calculating induction time (hr), and the results were each represented as an oxidative stability index (OSI). Table 3 shows the results.

(Thin Film Heating Test)

The fat or oil compositions shown in Table 3 were subjected to a thin film heating test. In the thin film heating test, 3 g of each of the fat or oil compositions were added to a stainless-steel petri dish with a diameter of 6 cm and placed on a hot plate heated to 150° C., and 10 minutes later, "degradation odor due to oxidation" was evaluated. Nine panelists evaluated their "degradation odor due to oxidation" in accordance with the following criteria, and mean values thereof were determined as scores. Table 3 shows the results.

(Degradation Odor Due to Oxidation)
5: Not sensed
4: Almost not sensed
3: Slightly sensed
2: Sensed
1: Clearly sensed

TABLE 3

| | Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Fat or oil a | 0.28 | 0.28 | 5.62 | 5.62 | 5.62 | 5.62 | 14.1 | 14.1 | 5.62 | 5.62 | 14.1 | 14.1 | 5.62 |
| Fat or oil b | 99.7 | 99.7 | 94.4 | 94.4 | 94.4 | 94.4 | 86 | 86 | 94.4 | 94.4 | 86 | 86 | 94.4 |
| (A) Ratio in fat or oil [mass %] | | | | | | | | | | | | | |
| C20:5 + C22:6 | 0.1 | 0.1 | 2 | 2 | 2 | 2 | 5 | 5 | 2 | 2 | 5 | 5 | 2 |
| (B) RME-1 [mass ppm] | 40 | 160 | 40 | 160 | 400 | 1,000 | 400 | 1,000 | 0 | 0 | 0 | 10 | 0 |
| (C) PE-1 [mass ppm] | 10 | 10 | 10 | 10 | 10 | 10 | 10 | 10 | 0 | 10 | 10 | 10 | 10 |
| (B)/(C) | 4 | 16 | 4 | 16 | 40 | 100 | 40 | 100 | — | 0 | 0 | 1 | 0 |
| (C20:5 + C22:6)/(B) | 25 | 6.25 | 500 | 125 | 50 | 20 | 125 | 50 | — | — | — | 5,000 | — |
| Mixed tocopherols [mass ppm] | 0 | 0 | 0 | 0 | 0 | 0 | 0 | 0 | 0 | 0 | 0 | 0 | 1,000 |

TABLE 3-continued

|  | Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| OSI | 4.53 | 4.77 | 3.93 | 4.41 | 5.06 | 6.25 | 3.93 | 5.23 | 3.61 | 3.62 | 2.69 | 2.83 | 4.04 |
| Degradation odor due to oxidation | 5 | 5 | 5 | 5 | 5 | 5 | 4 | 5 | 3 | 3 | 1 | 2 | 3 |

As is apparent from the results shown in Table 3, it found that the fat or oil compositions of the present invention have high oxidative stability and have suppressed degradation odor at the time of heating as well.

Examples 9 to 46 and Comparative Examples 6 to 19

(Preparation of Fat or Oil Compositions)

The fat or oil a, fat or oil b, rosemary extracts (RME-1 to RME-5), and dill extracts (PE-1 to PE-3) were mixed to prepare fat or oil compositions, respectively. The total contents of eicosapentaenoic acid (C20:5) and docosahexaenoic acid (C22:6) in constituent fatty acids of the fats or oils in the fat or oil compositions (total amount: 100 mass %), and the contents of the rosemary extracts, and the contents of the dill extracts in the fat or oil compositions are as shown in Tables 4 to 7. It should be noted that the blending amounts of the rosemary extract and dill extract in the preparations were determined from the contents of the extracts in the preparations shown in Table 2 so as to achieve the contents shown in Tables 4 to 7.

(Thin Film Heating Test)

The fat or oil compositions shown in Tables 4 to 7 were subjected to the thin film heating test in the same manner as above to evaluate the "degradation odor due to oxidation" In addition, nine panelists evaluated their "odor derived from rosemary extract" and "odor derived from dill extract" by the thin film heating test in the same manner as above in accordance with the following criteria, and mean values thereof were determined as scores. Tables 4 to 7 show the results.

(Odor Derived from Rosemary Extract)
5: Not sensed
4: Almost not sensed
3: Slightly sensed
2: Sensed
1: Clearly sensed (Odor Derived from Dill Extract)
5: Not sensed
4: Almost not sensed
3: Slightly sensed
2: Sensed
1: Clearly sensed

TABLE 4

|  | Example | | | | | | | | | |
| --- | --- | --- | --- | --- | --- | --- | --- | --- | --- | --- |
|  | 9 | 10 | 11 | 12 | 13 | 14 | 15 | 16 | 17 | 18 |
| Fat or oil a | 5.62 | 5.62 | 5.62 | 5.62 | 5.62 | 5.62 | 5.62 | 5.62 | 5.62 | 5.62 |
| Fat or oil b | 94.4 | 94.4 | 94.4 | 94.4 | 94.4 | 94.4 | 94.4 | 94.4 | 94.4 | 94.4 |
| (A) Ratio in fat or oil [mass %] | | | | | | | | | | |
| C20:5 + C22:6 | 2 | 2 | 2 | 2 | 2 | 2 | 2 | 2 | 2 | 2 |
| (B) RME-1 [mass ppm] | 40 | 40 | 40 | 40 | 40 | 160 | 160 | 160 | 160 | 160 |
| (C) PE-1 [mass ppm] | 20 | 4 | 1 | 0.4 | 0.2 | 80 | 16 | 4 | 1.6 | 0.8 |
| (B)/(C) | 2 | 10 | 40 | 100 | 200 | 2 | 10 | 40 | 100 | 200 |
| (C20:5 + C22:6)/(B) | 500 | 500 | 500 | 500 | 500 | 125 | 125 | 125 | 125 | 125 |
| Odor derived from rosemary extract | 5 | 5 | 5 | 5 | 5 | 5 | 5 | 5 | 5 | 4 |
| Odor derived from dill extract | 4 | 5 | 5 | 5 | 5 | 3 | 4 | 5 | 5 | 5 |
| Degradation odor due to oxidation | 4 | 4 | 4 | 4 | 4 | 5 | 5 | 5 | 5 | 5 |

|  | Example | | | | | | | | | |
| --- | --- | --- | --- | --- | --- | --- | --- | --- | --- | --- |
|  | 19 | 20 | 21 | 22 | 23 | 24 | 25 | 26 | 27 | 28 |
| Fat or oil a | 5.62 | 5.62 | 5.62 | 5.62 | 5.62 | 5.62 | 5.62 | 5.62 | 5.62 | 5.62 |
| Fat or oil b | 94.4 | 94.4 | 94.4 | 94.4 | 94.4 | 94.4 | 94.4 | 94.4 | 94.4 | 94.4 |
| (A) Ratio in fat or oil [mass %] | | | | | | | | | | |
| C20:5 + C22:6 | 2 | 2 | 2 | 2 | 2 | 2 | 2 | 2 | 2 | 2 |
| (B) RME-1 [mass ppm] | 400 | 400 | 400 | 400 | 400 | 1,000 | 1,000 | 1,000 | 1,000 | 1,000 |
| (C) PE-1 [mass ppm] | 200 | 40 | 10 | 4 | 2 | 500 | 100 | 25 | 10 | 5 |
| (B)/(C) | 2 | 10 | 40 | 100 | 200 | 2 | 10 | 40 | 100 | 200 |
| (C20:5 + C22:6)/(B) | 50 | 50 | 50 | 50 | 50 | 20 | 20 | 20 | 20 | 20 |
| Odor derived from rosemary extract | 5 | 5 | 5 | 4 | 4 | 5 | 5 | 4 | 4 | 4 |

TABLE 4-continued

|  | | | | | | | | | |
|---|---|---|---|---|---|---|---|---|---|
| Odor derived from dill extract | 3 | 4 | 5 | 5 | 4 | 3 | 4 | 4 | 4 | 4 |
| Degradation odor due to oxidation | 5 | 5 | 5 | 5 | 5 | 5 | 5 | 5 | 5 | 5 |

| | Comparative Example | | | | | | | | | |
|---|---|---|---|---|---|---|---|---|---|---|
| | 6 | 7 | 8 | 9 | 10 | 11 | 12 | 13 | 14 | 15 |
| Fat or oil a | 5.62 | 5.62 | 5.62 | 5.62 | 5.62 | 5.62 | 5.62 | 5.62 | 5.62 | 5.62 |
| Fat or oil b | 94.4 | 94.4 | 94.4 | 94.4 | 94.4 | 94.4 | 94.4 | 94.4 | 94.4 | 94.4 |
| (A) Ratio in fat or oil [mass %] | | | | | | | | | | |
| C20:5 + C22:6 | 2 | 2 | 2 | 2 | 2 | 2 | 2 | 2 | 2 | 2 |
| (B) RME-1 [mass ppm] | 0 | 40 | 160 | 160 | 160 | 400 | 400 | 2,000 | 2,000 | 2,000 |
| (C) PE-1 [mass ppm] | 4 | 40 | 0 | 160 | 0.4 | 400 | 1 | 1,000 | 50 | 10 |
| (B)/(C) | 0 | 1 | — | 1 | 400 | 1 | 400 | 2 | 40 | 200 |
| (C20:5 + C22:6)/(B) | — | 500 | 125 | 125 | 125 | 50 | 50 | 10 | 10 | 10 |
| Odor derived from rosemary extract | 5 | 5 | 1 | 4 | 2 | 5 | 2 | 3 | 2 | 2 |
| Odor derived from dill extract | 4 | 2 | 5 | 2 | 5 | 1 | 4 | 1 | 2 | 3 |
| Degradation odor due to oxidation | 2 | 4 | 5 | 5 | 5 | 5 | 5 | 5 | 5 | 5 |

TABLE 5

| | Example | | | | | | | | | | | |
|---|---|---|---|---|---|---|---|---|---|---|---|---|
| | 29 | 30 | 31 | 32 | 33 | 34 | 35 | 36 | 37 | 38 | 39 | 40 |
| Fat or oil a | 0.28 | 0.28 | 0.28 | 0.28 | 14.1 | 14.1 | 14.1 | 14.1 | 28.1 | 28.1 | 28.1 | 28.1 |
| Fat or oil b | 99.7 | 99.7 | 99.7 | 99.7 | 86 | 86 | 86 | 86 | 71.9 | 71.9 | 71.9 | 71.9 |
| (A) Ratio in fat or oil [mass %] | | | | | | | | | | | | |
| C20:5 + C22:6 | 0.1 | 0.1 | 0.1 | 0.1 | 5 | 5 | 5 | 5 | 10 | 10 | 10 | 10 |
| (B) RME-1 [mass ppm] | 40 | 160 | 400 | 1,000 | 40 | 160 | 400 | 1,000 | 40 | 160 | 400 | 1,000 |
| (C) PE-1 [mass ppm] | 1 | 4 | 10 | 25 | 1 | 4 | 10 | 25 | 1 | 4 | 10 | 25 |
| (B)/(C) | 40 | 40 | 40 | 40 | 40 | 40 | 40 | 40 | 40 | 40 | 40 | 40 |
| (C20:5 + C22:6)/(B) | 25 | 6.25 | 2.5 | 1 | 1,250 | 313 | 125 | 50 | 2,500 | 625 | 250 | 100 |
| Odor derived from rosemary extract | 5 | 5 | 5 | 5 | 5 | 5 | 5 | 5 | 5 | 5 | 5 | 5 |
| Odor derived from dill extract | 5 | 5 | 4 | 4 | 5 | 5 | 4 | 4 | 5 | 5 | 4 | 4 |
| Degradation odor due to oxidation | 5 | 5 | 5 | 5 | 3 | 4 | 4 | 5 | 3 | 3 | 4 | 5 |

TABLE 6

| | Example | | | | Comparative Example | | | |
|---|---|---|---|---|---|---|---|---|
| | 41 | 42 | 43 | 44 | 16 | 17 | 18 | 19 |
| Fat or oil a | 5.62 | 5.62 | 5.62 | 5.62 | 5.62 | 5.62 | 5.62 | 5.62 |
| Fat or oil b | 94.4 | 94.4 | 94.4 | 94.4 | 94.4 | 94.4 | 94.4 | 94.4 |
| (A) Ratio in fat or oil [mass %] | | | | | | | | |
| C20:5 + C22:6 | 2 | 2 | 2 | 2 | 2 | 2 | 2 | 2 |
| (B) RME-2 [mass ppm] | 160 | — | — | — | 160 | — | — | — |
| (B) RME-3 [mass ppm] | — | 160 | — | — | — | 160 | — | — |
| (B) RME-4 [mass ppm] | — | — | 160 | — | — | — | 160 | — |
| (B) RME-5 [mass ppm] | — | — | — | 160 | — | — | — | 160 |
| (C) PE-1 [mass ppm] | 4 | 4 | 4 | 4 | 0 | 0 | 0 | 0 |
| (B)/(C) | 40 | 40 | 40 | 40 | — | — | — | — |
| (C20:5 + C22:6)/(B) | 125 | 125 | 125 | 125 | 125 | 125 | 125 | 125 |
| Odor derived from rosemary extract | 5 | 5 | 5 | 5 | 2 | 2 | 2 | 2 |
| Odor derived from dill extract | 4 | 5 | 3 | 4 | 5 | 5 | 5 | 5 |
| Degradation odor due to oxidation | 5 | 5 | 5 | 5 | 5 | 5 | 5 | 5 |

TABLE 7

| | Example | |
|---|---|---|
| | 45 | 46 |
| Fat or oil a | 5.62 | 5.62 |
| Fat or oil b | 94.4 | 94.4 |
| (A) Ratio in fat or oil [mass %] | | |
| C20:5 + C22:6 | 2 | 2 |
| (B) RME-1 [mass ppm] | 160 | 160 |
| (C) Each PE/ppm | 4 | 4 |

TABLE 8

| | Example | | | | | | Comparative Example | | | |
|---|---|---|---|---|---|---|---|---|---|---|
| | 47 | 48 | 49 | 50 | 51 | 52 | 20 | 21 | 22 | 23 |
| Fat or oil a | 0.28 | 0.28 | 0.28 | 0.28 | 0.28 | 14.1 | 0.28 | 0.28 | 0.28 | 0.28 |
| Fat or oil b | 99.7 | 99.7 | 99.7 | 99.7 | 99.7 | 86 | 99.7 | 99.7 | 99.7 | 99.7 |
| (A) Ratio in fat or oil [mass %] | | | | | | | | | | |
| C20:5 + C22:6 | 2 | 2 | 2 | 2 | 0.1 | 5 | 2 | 2 | 2 | 2 |
| (B) RME-1 [mass ppm] | 40 | 160 | 160 | 400 | 160 | 160 | 160 | 2,000 | 0 | 160 |
| (C) PE-1 [mass ppm] | 1 | 80 | 4 | 10 | 4 | 4 | 0.4 | 50 | 0 | 0 |
| (B)/(C) | 40 | 2 | 40 | 40 | 40 | 40 | 400 | 40 | — | — |
| (C20:5 + C22:6)/(B) | 500 | 125 | 125 | 50 | 6.25 | 313 | 125 | 10 | — | 125 |
| Odor derived from rosemary extract | 5 | 5 | 5 | 4 | 5 | 5 | 2 | 2 | 5 | 2 |
| Odor derived from dill extract | 5 | 3 | 5 | 5 | 5 | 5 | 3 | 2 | 2 | 5 |
| Degradation odor due to oxidation | 5 | 5 | 5 | 5 | 5 | 5 | 5 | 5 | 4 | 5 |

TABLE 7-continued

| | Example | |
|---|---|---|
| | 45 | 46 |
| (C) Kind of PE | PE-2 | PE-3 |
| (B)/(C) | 40 | 40 |
| (C20:5 + C22:6)/(B) | 125 | 125 |
| Odor derived from rosemary extract | 5 | 5 |
| Odor derived from dill extract | 4 | 4 |
| Degradation odor due to oxidation | 5 | 5 |

As is apparent from the results shown in Tables 4 to 7, it found that the fat or oil compositions of the present invention have less unpleasant odor peculiar to the rosemary extract and suppressed degradation odor due to oxidation of the fat or oil at the time of cooking as well. In addition, the odor derived from the dill extract was also hardly sensed.

Examples 47 to 52 and Comparative Examples 20 to 23

(Preparation of Fat or Oil Compositions)

The fat or oil a, fat or oil b, rosemary extract (RME-1), and dill extract (PE-1) were mixed to prepare fat or oil compositions, respectively. The total contents of eicosapentaenoic acid (C20:5) and docosahexaenoic acid (C22:6) in constituent fatty acids of the fats or oils in the fat or oil compositions (total amount: 100 mass %), and the contents of the rosemary extract, and the contents of the dill extract in the fat or oil compositions are as shown in Table 8. It should be noted that the blending amounts of the rosemary extract and dill extract in the preparations were determined from the contents of the extracts in the preparations shown in Table 2 so as to achieve the contents shown in Table 8.

(Evaluation by Cooking of Scrambled Eggs)

13 g of each of the fat or oil compositions shown in Table 8, 50 g of egg liquid, and 0.5 g of salt were used to prepare scrambled eggs. Nine panelists evaluated the scrambled eggs in accordance with the criteria for the "degradation odor due to oxidation", "odor derived from rosemary extract", and "odor derived from dill extract", and mean values thereof were determined as scores. Table 8 shows the results.

As is apparent from the results shown in Table 8, it found that the scrambled eggs cooked using the fat or oil compositions of the present invention have no degradation odor and no unpleasant odor derived from the rosemary extract and the dill extract, and have good taste and flavor.

The invention claimed is:

1. A fat or oil composition, comprising components (A), (B), and (C):
   (A) a fat or oil in which a total content of eicosapentaenoic acid and docosahexaenoic acid in constituent fatty acids of the fat or oil is from 0.1 to 10 mass % with respect to total constituent fatty acids of the fat or oil;
   (B) 0.001 to 0.1 mass % of a rosemary extract; and
   (C) a dill extract,
   wherein a mass ratio of a content of component (B) to a content of component (C), [(B)/(C)], is from 4 to 200,
   wherein a content of triacylglycerols in the fat or oil as component (A) is from 78 to 100 mass %, and
   wherein a ratio of the total content of the eicosapentaenoic acid and the docosahexaenoic acid in the constituent fatty acids of the fat or oil as component (A) to a content of the rosemary extract as component (B) in the fat or oil composition, [C20:5+C22:6/(B)], is from 1 to 500.

2. The fat or oil composition according to claim 1, wherein the total content of eicosapentaenoic acid and docosahexaenoic acid in the constituent fatty acids of the fat or oil as component (A) is from 0.3 to 10 mass %.

3. The fat or oil composition according to claim 1, wherein the total content of eicosapentaenoic acid and docosahexaenoic acid in the constituent fatty acids of the fat or oil as component (A) is from 1 to 7 mass %.

4. The fat or oil composition according to claim 1, wherein component (A) comprises at least one fat or oil selected from the group consisting of fish oil and alga oil.

5. The fat or oil composition according to claim 1, wherein a content of the rosemary extract as component (B) is from 0.004 to 0.1 mass %.

6. The fat or oil composition according to claim 1, wherein a content of the rosemary extract as component (B) is from 0.008 to 0.1 mass %.

7. The fat or oil composition according to claim 1, wherein a content of the rosemary extract as component (B) is from 0.016 to 0.1 mass %.

8. The fat or oil composition according to claim 1, wherein the ratio of the total content of the eicosapentaenoic acid and the docosahexaenoic acid in the constituent fatty acids of the fat or oil as component (A) to a content of the rosemary extract as component (B) in the fat or oil composition, [C20:5+C22:6/(B)], is from 10 to 500.

9. The fat or oil composition according to claim 1, wherein the ratio of the total content of the eicosapentaenoic acid and the docosahexaenoic acid in the constituent fatty acids of the fat or oil as component (A) to a content of the rosemary extract as component (B) in the fat or oil composition, [C20:5+C22:6/(B)], is from 20 to 500.

10. The fat or oil composition according to claim 1, wherein a content of the dill extract as component (C) is from 0.00002 to 0.05 mass %.

11. The fat or oil composition according to claim 1, wherein a content of the dill extract as component (C) is from 0.00004 to 0.02 mass %.

12. The fat or oil composition according to claim 1, wherein a content of the dill extract as component (C) is from 0.0001 to 0.01 mass %.

13. The fat or oil composition according to claim 1, wherein a mass ratio of a content of the rosemary extract as component (B) to a content of as the dill extract as component (C), [(B)/(C)], is from 10 to 150.

14. The fat or oil composition according to claim 1, wherein a mass ratio of a content of the rosemary extract as component (B) to a content of as the dill extract as component (C), [(B)/(C)], is from 16 to 100.

15. The fat or oil composition according to claim 1, wherein a mass ratio of a content of the rosemary extract as component (B) to a content of as the dill extract as component (C), [(B)/(C)], is from 40 to 100.

16. The fat or oil composition according to claim 1, comprising from 95 to 99.95 mass % of the fat or oil as component (A).

17. The fat or oil composition according to claim 1, further comprising at least one selected from the group consisting of a tocopherol and an ascorbic acid ester.

18. The fat or oil composition according to claim 1, wherein a content of unsaturated fatty acids in the constituent fatty acids of the fat or oil as component (A) other than eicosapentaenoic acid and docosahexaenoic acid is from 60 to 100 mass %.

19. The fat or oil composition according to claim 1, wherein the content of triacylglycerols in the fat or oil as component (A) is from 78 to 99.5 mass %.

20. The fat or oil composition according to claim 1, wherein the mass ratio of the content of component (B) to the content of component (C), [(B)/(C)], is from 10 to 200.

21. The fat or oil composition according to claim 20, wherein antioxidants in the composition consist essentially of the rosemary extract and the dill extract.

* * * * *